I. W. BARTLETT.
Wheel-Plow.
No. 60,461. Patented Dec. 18, 1866.
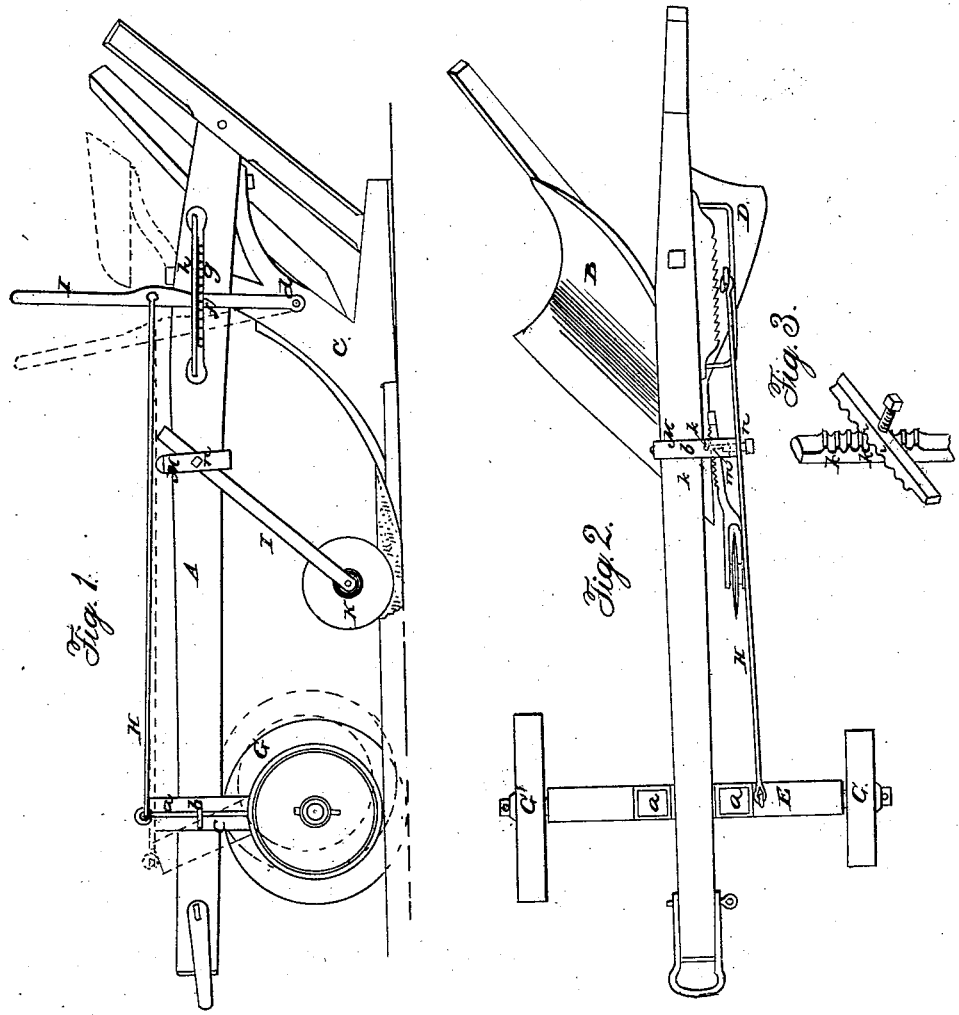

United States Patent Office.

IMPROVEMENT IN PLOUGHS.

IRA W. BARTLETT, OF OTTER CREEK, ILLINOIS.

Letters Patent No. 60,461, dated December 18, 1866.

---

The Schedule referred to in these Letters Patent and making part of the same.

---

TO ALL WHOM IT MAY CONCERN:

Be it known that I, IRA W. BARTLETT, of Otter Creek, in the county of Jersey, and State of Illinois, have invented certain new and useful Improvements in Ploughs; and I do hereby declare that the following is a full and exact description thereof, reference being had to the accompanying drawings, making part of this specification.

Figure 1 is an elevation of my improvements, looking on the land side.

Figure 2, a plan of the same.

Figure 3 is a detached view, showing the manner of securing and adjusting the coulter bar.

Like letters of reference indicate corresponding parts in all the figures.

My improvement belongs to that class known as prairie ploughs, in which the operator rides upon the plough. The invention consists, first, in the employment of an axle with supporting-wheels under the front of the beam, in combination with a connecting-rod and lever, by which means the operator can vary the depth of the furrow at pleasure; and second, in an arrangement of teeth and a set-screw with a suitable stirrup for securing the coulter bar in place.

As represented in the drawings, A is the beam, B the mould-board, and C the land side, arranged substantially as usual. The position of the operator's seat is over the plough, as indicated in the red outline, fig. 1. The land side is provided with a horizontal share, D, in the form of a wedging-blade, substantially as shown in the drawings, the purpose of which is to cut under the solid sward as the plough turns the furrow on the opposite side. Two important results are secured by the employment of this share: first, it serves as a sort of balance to the mould-board in turning the furrow, by holding under the earth upon the land side, by which the strain is divided more equally and the draught is more regular; and not only this, but the plough retains its place more perfectly in the earth, and the furrow is therefore turned better and of a more uniform thickness; second, by cutting under the sward each succeeding furrow may be turned of a greater width than usual, since the same is loosened in a degree and rendered free of the roots. This will be appreciated when it is considered that the prairie sward is very tough and the roots run deep into the soil. In ordinary ploughs the mould-board cuts but little more than its own width; but by the employment of the share D, running under the sod, a much greater width may be cut. Under ordinary circumstances a twelve-inch plough of this kind will turn an eighteen-inch furrow. The pressure of the furrow on the mould-board will keep the share in place at all times. Under the front end of the beam is situated an axle, E, with guide-arms, a a, enclosing the beam, and pivoted thereto at b. On the ends of this axle are wheels or trucks, G and G'; the former running upon the sward and the latter (of larger size) running in the furrow. To cut different widths of furrow, the axle must be of different lengths, or an adjusting arrangement may be employed for the purpose. To the axle is secured an arm, e, extending upward, having jointed to its top a rod, H, connecting at its opposite end in a similar manner with a lever, I, pivoted at d, to the plough, and projecting up within reach of the operator. The lever is provided with a sharp edge, f, that engages at any position with a set of ratchet-teeth, g, secured to the side of the plough. It is held in engagement with the teeth by a spring, h, which may also form a guide to retain the lever in place, as shown in the drawings. By this means it will be seen that the front end of the beam may be raised or lowered to cut a shallower or deeper furrow, by the operator's simply setting the lever further forward or back on the ratchet-teeth, the axle and wheels assuming a corresponding angle, as indicated by the red lines, fig. 1. In prairie ploughs especially, this arrangement is of much advantage, as it enables the operator to cut deep or shallow at pleasure without removing from his seat. In addition to this, the plough will be retained in its upright and proper position at all times, without danger of running out of the ground, by reason of its beam fitting between the guide-arms a a, and the axle, always sustaining its level position. As there are no rocks nor stumps in the soil, and as the land is level on the prairie, no further guiding of the plough is necessary. In order to cut the tough prairie sod in front of the plough proper, I employ a disk or wheel-cutter, K, pivoted to a coulter bar, L. Under ordinary circumstances, much difficulty is experienced in holding this bar in place. In order to overcome this difficulty I make angular teeth or cogs, i i, on the inside of the coulter bar, which, when the bar stands in the proper position to hold the coulter wheel, engage with similar teeth or cogs, k k, on a ratchet-bar, $l$, resting in slots, $m$, of the stirrup or eye, M, secured to the beam. The coulter bar is held in place by a set-screw, $n$, passing through the stirrup and resting against it. I secure several advantages by this arrangement. I am enabled to adjust the coulter bar higher or lower at pleasure, and as the teeth intermatch, there can be no danger of slipping from that position up or down, unless they become disengaged; and since the resistance of the earth against the coulter has a tendency to bear the latter backward, a leverage is produced at the upper end, which has a tendency to bind the cogs together, and the great friction will effectively prevent their separation. The set-screw allows adjustment or removal of the coulter bar in the simplest manner. By placing slips of wood behind the ratchet-bar, $l$, next the beam, at any time, the lateral adjustment of the coulter is readily produced.

What I claim as my invention, and desire to secure by Letters Patent, is—

1. The axle and wheels E G G′, combined with the rod H, and lever I, when employed in connection with the beam A, for governing the depth of the plough, as herein set forth.

2. The combination of the ratchet-bar $l$, and set-screw $n$, with the toothed coulter bar L, arranged and operating as herein set forth.

In witness whereof I have hereunto signed my name in the presence of two subscribing witnesses.

IRA W. BARTLETT.

Witnesses:
 L. HUMISTON,
 JOHN COOLEY.